United States Patent [19]
Braun

[11] 3,970,687
[45] July 20, 1976

[54] POLYESTERS WITH SUBSTITUTED AMINE END GROUPS
[75] Inventor: Robert A. Braun, Rochester, N.Y.
[73] Assignee: E. I. Du Pont de Nemours and Company, Wilmington, Del.
[22] Filed: Dec. 10, 1973
[21] Appl. No.: 423,015

Related U.S. Application Data
[63] Continuation-in-part of Ser. Nos. 776,823, Nov. 18, 1968, abandoned, and Ser. No. 120,769, March 3, 1971, Pat. No. 3,684,771, and Ser. No. 241,402, April 5, 1972, abandoned.

[52] U.S. Cl. .................. 260/482 C; 252/62.51; 260/37 R; 260/75 TN; 260/77.5 AN; 260/77.5 MA; 260/77.5 AT; 260/78.3 R; 260/247.2 A; 260/295 PA; 260/465.4; 260/468 E; 260/475 P; 260/481 C; 260/482 B; 260/484 R; 260/485 G; 260/537 R
[51] Int. Cl.² ........................................ C07C 125/06
[58] Field of Search ........ 260/468 E, 481 C, 482 C, 260/482 B

[56] References Cited
UNITED STATES PATENTS
3,427,332  2/1969  Allen ............................. 260/482 C
3,448,049  6/1969  Preuss ........................... 260/482 C Primary Examiner—Paul J. Killos

[57] ABSTRACT
Polyester represented by the general structure

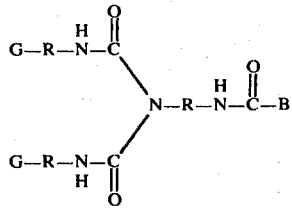

useful as film-formers in coating compositions.

3 Claims, No Drawings

POLYESTERS WITH SUBSTITUTED AMINE END GROUPS

CROSS-REFERENCE TO RELATED APPLICATIONS

This application is a continuation-in-part of applications Ser. No. 776,823, filed Nov. 18, 1968, now abandoned, Ser. No. 120,769, filed Mar. 3, 1971, now U.S. Pat. No. 3,684,771, and Ser. No. 241,402, filed Apr. 5, 1972, now abandoned.

STATEMENT OF THE INVENTION

This invention relates to polyesters. It is more particularly directed to polyesters represented by the structure

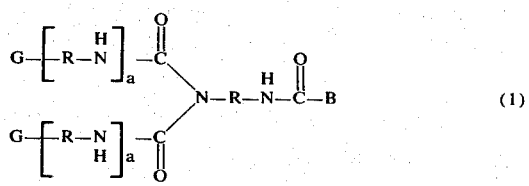

where G can be the residue of a basic radical which, as an entity before reaction, has a $pK_a$ value of 5–14, or a salt thereof;

R can be alkylene of 2 through 36 carbon atoms, phenylene, tolylene,

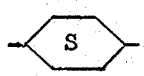

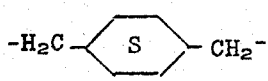

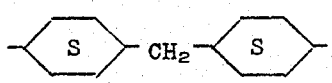

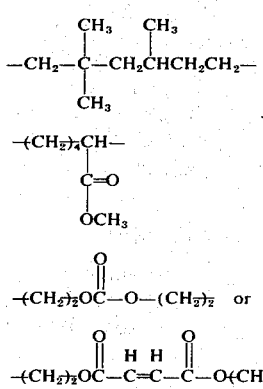

B can be a segment of a polyester or copolyester having a number average molecular weight of 500–50,000, preferably 1000–20,000;

$a$ can be 1, 2 or 3.

UTILITY

The polymers of the invention are useful as film-formers in coating compositions, particularly when combined with a second polymer having complementary reactive groups. Illustrative of such second polymers are heat reactive phenolics, polyglycidyl ethers and esters, polyisocyanate resins, butylated urea/formaldehyde resins and melamine/formaldehyde/alkanol resins.

The polymers of the invention can be cured as film-formers by mixing from about 55 to about 95 parts of the polymer with from about 5 to 45 parts of the second complementary polymer, in a suitable solvent. This solution can then be used directly to give clear coatings, or it may be pigmented as desired.

The coating composition can be applied conventionally and is preferably then baked for from about 10 to 30 minutes at 80°–200°C.

The polymers of the invention are also useful as aids for dispersing solid particles in organic liquids. They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, toluidine red, quinacridone and the like.

Pigment dispersions made with polymers of the invention are remarkably resistant to flocculation, which gives the paints into which dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymer of the invention can have a significantly higher pigment content, while retaining the same degree of fluidity, than when conventional aids are used.

The polymers of the invention can be used as pigment dispersing aids by dissolving from 0.001 to about 2.00 grams of polymer per square meter[1] of surface of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols, and mixtures of these.

An appropriate amount of pigment is then added to this solution, which is then subjected to shear, as by sand-grinding, or ball-milling, to deagglomerate and disperse the pigment. This pigment dispersion or millbase can be then added directly to a paint.

Polymers of the invention preferred for use as pigment dispersing aids are those of formula (1) wherein G is an amino-, hydroxy-, or mercapto substituted amine or amine salt radical. Especially preferred are those materials where G is

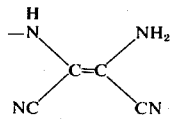

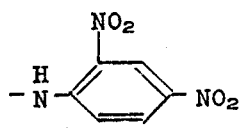
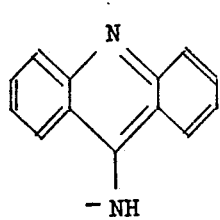

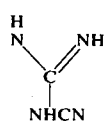
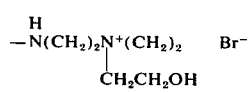

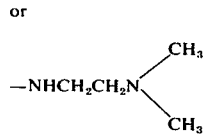

Polymers of the invention also preferred for use as pigment dispersing aids are those of formula (1) where G is

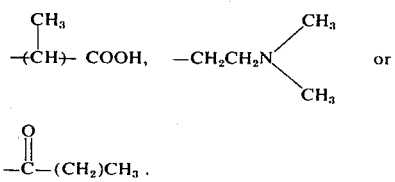

where Z can be alkyl of 1 through 20 carbon atoms, hydroxyalkyl of 1 through 20 carbon atoms, carboxyalkyl of 1 through 20 carbon atoms, hydroxy/carboxy alkyl of 1 through 20 carbon atoms, alkylene-dialkylamino,

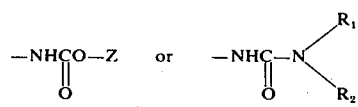

or
—CH₂CH₂NHNH₂;

and

R₁ and R₂ can be hydrogen, alkyl of 1 through 6 carbon atoms, —NH₂, —O

Also preferred are these polymers of formula (1) where R is alkylene of 2 through 10 carbon atoms, and $a$ is 2 or 3. More preferred are those polymers of the formula:

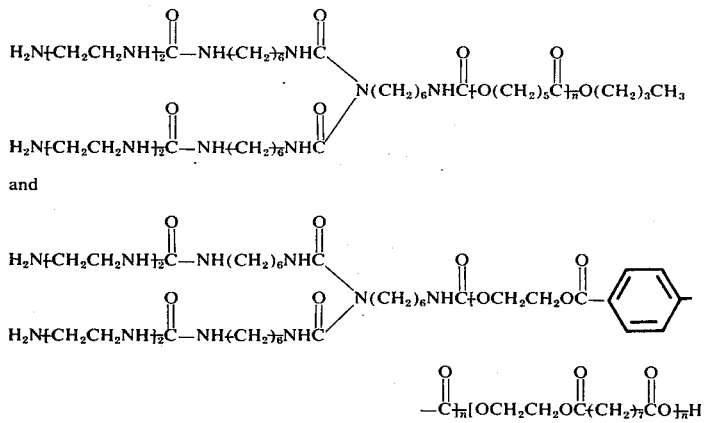

wherein $n = 10$ through 200. Especially preferred are those whose preparation is shown in Examples 1, 3, 6, 7 and 8.

The polymers of the invention are also useful for dispersing magnetic oxides such as iron oxide and chromium dioxide in compositions used to prepare magnetic tape. Use of 0.5–10%, by weight of such a composition, of a polymer of the invention promotes wetting of the oxide, improves adhesion of the composition to the tape substrate and improves the tape's magnetic properties.

The polymers of the invention can also be used to disperse pigments and dyes in fiber-forming polymers. They are especially useful in dispersing carbon black in polyesters, where they minimize filter clogging and enhance fiber color. The polymers of Examples 9 and 10 are preferred for this use.

PREPARATION OF THE POLYMERS

To make the polymers of the invention, one mole of a hydroxyl-terminated polyester or copolyester is condensed with one mole of a triisocyanate, according to the general equation:

---

[1] Measured by the Brunauer, Emmett and Teller nitrogen adsorption method described on page 30 of "Colloidal Dispersions" by Earl K. Fischer, published by John Wiley and Sons in 1950.

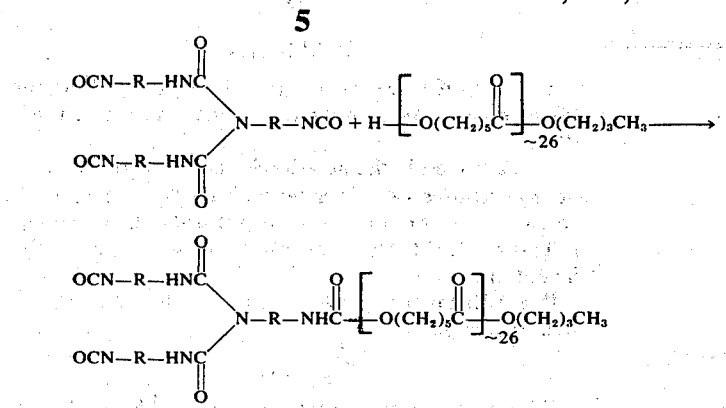

In this equation, R is an alkylene group.

The hydroxyl-terminated polyester or copolyester can be prepared by
1. Polymerizing a lactone such as propiolactone, caprolactone or pivalolactone.
2. Condensing a glycol and a dibasic acid in the presence of a mono-alcohol. The formation of polyesters capped at both ends with hydroxyl groups should be minimized. This can be done by controlling the stoichiometry of the reaction so that the acid number and the hydroxyl number of the polyester are approximately equal.
3. Condensing a hydroxy acid in the presence of a small amount of mono-alcohol.
4. Condensing a diol and a mixture of diacids or diesters, a diacid and a mixture of diols, or a mixture of diols and a mixture of diacids or diesters.

Illustrative of these reactions are

These reactions are described in greater detail in "Preparative Methods of Polymer Chemistry", Sorenson and Campbell, Interscience Publishers, Inc. New York, N.Y. (1961), pp. 111–127 and 242–247 and "Polyesters and Their Applications". Bjorksten Research Laboratories, Inc., Reinhold Publishing Corp., New York, N.Y. (1956).

The polyester thus prepared is dissolved in an inert liquid like anhydrous benzene. The tri-isocyanate is then added, together with about 0.1% (by weight) of dibutyl tin dilaurate. This mixture is heated for about one hour at 80°–130°C. The resulting product can be isolated by stripping off the solvent at 100°C. and a pressure of 20 mm.

The polymers of the invention are modifications made by reacting the product, without isolation, with compounds having active hydrogen atoms. Illustrative of such compounds are

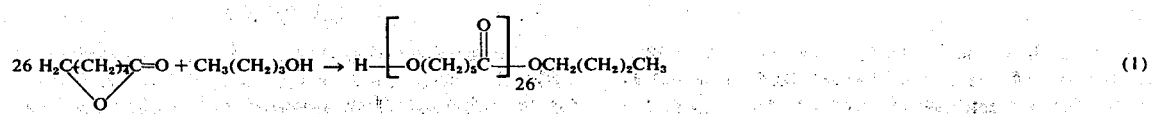

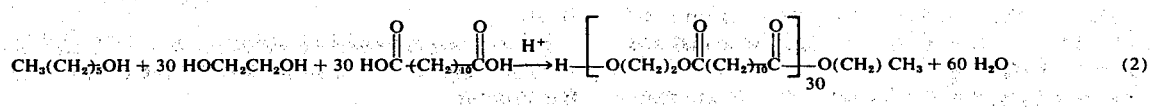

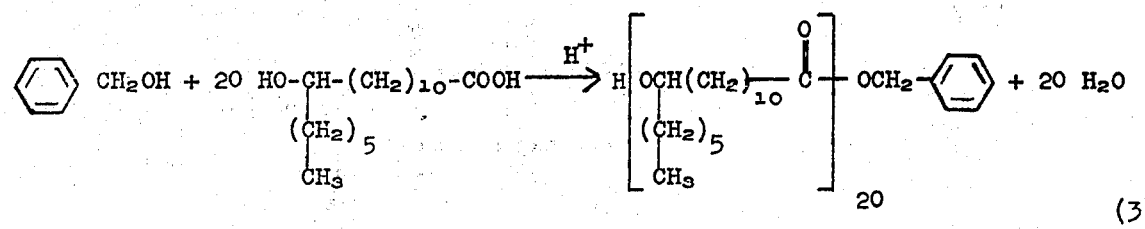

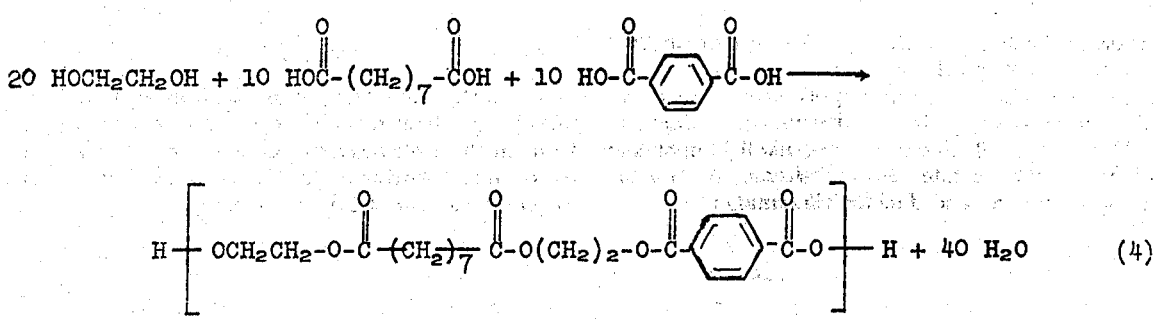

| Active Hydrogen Compound | Resulting G Group |
|---|---|
| $H_2O$ | $-NH_2$ |
| $HO-Z$ | $-NHCOZ$ (C=O) |
| $NH_3$ | $-NH-\underset{\overset{\|}{O}}{C}-NH_2$ |
| $H_2NNH_2$ | $-NH\underset{\overset{\|}{O}}{C}NHNH_2$ |
| $NH_2OH$ | $-NH\underset{\overset{\|}{O}}{C}NHOH$ |
| $HOCH_2CH_2N(CH_3)_2$ | $-NH\underset{\overset{\|}{O}}{C}-OCH_2CH_2N(CH_3)_2$ |
| $HOCH_2CH_2N{\diagup}O{\diagdown}$ | $-NH\underset{\overset{\|}{O}}{C}OCH_2CH_2N{\diagup}O{\diagdown}$ |
| $HOCH_2CH_2NHNH_2$ | $-NH\underset{\overset{\|}{O}}{C}OCH_2CH_2NHNH_2$ |
| $H_2NNH\underset{\overset{\|}{O}}{C}-CH_2CH_3$ | $-NH\underset{\overset{\|}{O}}{C}NHNH\underset{\overset{\|}{O}}{C}-CH_2CH_3$ |
| $H_2NCH_2CH_2N(CH_3)_2$ | $-NH\underset{\overset{\|}{O}}{C}-NHCH_2CH_2N(CH_3)_2$ |
| $\text{Ph-}CH_2NH_2$ | $-NH\underset{\overset{\|}{O}}{C}-NH-CH_2-\text{Ph}$ |
| $\text{Ph-}NH_2$ | $-NH\underset{\overset{\|}{O}}{C}-NH-\text{Ph}$ |
| $HOCH_2-\underset{\underset{CH_2OH}{\|}}{\overset{\overset{O}{\|}}{C}}-CH_2OH$ | $-NH\underset{\overset{\|}{O}}{C}-OCH_2C(CH_2OH)_3$ |

To make such a modification, 1–2 moles of reactant for each mole of the polyester-isocyanate product is added to the polyester-isocyanate reaction mass, together with another 0.1% (by weight) of dibutyl tin dilaurate. This mixture is then heated for about one hour at 80°–130°C.

The resulting polymer can be isolated from the reaction mass by heating it at 100°C. for one hour at 20 mm. pressure to strip off volatiles.

The physical properties of the polymers of the invention thus prepared range from viscous liquid to friable solid. They are soluble in common organic liquids such as toluene, ethyl acetate, tetrahydrofuran, acetone, hexane, cyclohexane and dimethylformamide.

EXAMPLES

The following examples are submitted so that the invention may be more readily understood and practiced.

Those skilled in the art will no doubt be able to compose numerous variations on their central theme, such as the attachment of innocuous substituents. It is naturally considered that these variations are a part of the invention.

In the Examples all parts are by weight unless otherwise indicated.

EXAMPLE 1

Fifty-nine and two tenths parts of butyl alcohol initiated polycaprolactone (molecular weight 2960) were dissolved in 100 parts of reagent grade benzene. To this were added, with stirring and in a nitrogen atmosphere, 15.3 parts of a 75% solution of $$OCH-(CH_2)_6N[\overset{\overset{O}{\|}}{C}-NH(CH_2)_6-NCO]_2^*,$$

*Sold by Naftone, Inc. as Desmodur N75.

in cellosolve acetate. One-tenth part of dibutyl tin dilaurate catalyst was added and the mixture heated at 80°C. for 1 hour.

The solvent was stripped off at 100°C. and 20 mm. of pressure to give a waxy solid having the structure

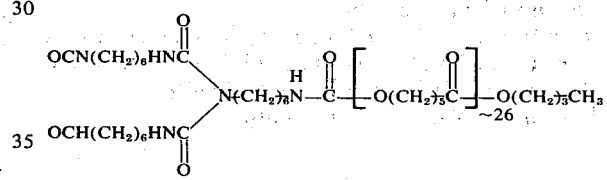

EXAMPLE 2

To the product of Example 1, before stripping, were added 5 parts of absolute ethanol and 0.1 part of dibutyl tin dilaurate. This mixture was refluxed for one hour.

Solvent was removed by stripping at 100°C. and 20 mm. of pressure. The product was a waxy solid having the structure

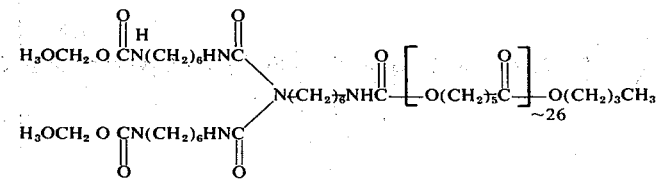

EXAMPLE 3

For thirty minutes, ammonia gas was bubbled through the final reaction mass (before stripping) of Example 1. Excess ammonia and solvent were then removed by stripping at 100°C. and 20 mm. of pressure to give a waxy solid having the structure

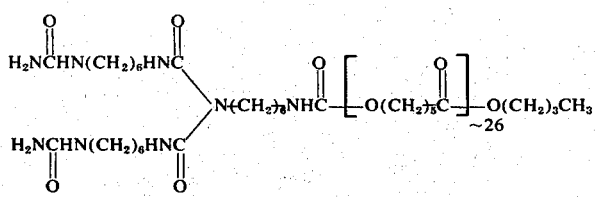

EXAMPLE 4

To the product of Example 1, before stripping, were added 3.5 parts of anhydrous hydrazine. The mixture was heated at 80°C. for 1 hour.

Excess hydrazine and solvent were removed by stripping at 100°C. and 20 mm. of pressure to give a waxy solid having the structure

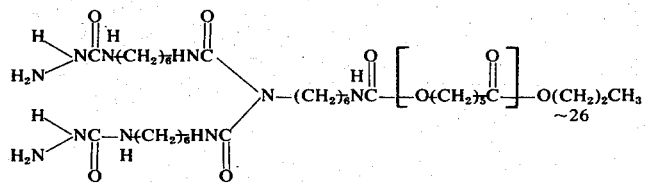

EXAMPLE 5

To the product of Example 1, before stripping, were added 3 parts of water and 0.1 part of dibutyl tin dilaurate. The mixture was heated for one hour at 80°C.

Excess water and solvent were then removed by stripping at 100°C. and 20 mm. of pressure to give a waxy solid having the structure

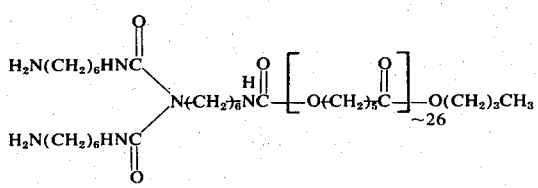

EXAMPLE 6

The procedure of Example 4 was followed, except that 2 parts of N,N-dimethylethylene diamine were substituted for the hydrazine.
The product had the structure

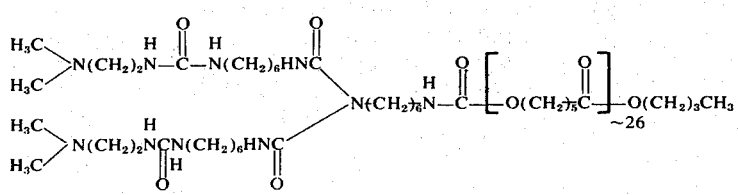

EXAMPLE 7

A mixture of

| | |
|---|---|
| Monohydroxypolycaprolactone* and | 1500 parts |
| Toluene | 1500 parts |

*Sold by Union Carbide Co. Its molecular weight is about 3,000.

was refluxed for one-half hour. Two hundred parts of distillate were collected and discarded.

This mixture was then added, over a ½ hour period, to 319 parts of Desmodur N 0.5 Part of dibutyltin dilaurate was added to the resulting mixture, which was then refluxed for one-half hour.

The mixture was then cooled to room temperature, 103 parts of diethylenetriamine were added, followed by one-half hour of refluxing.

The resulting product has the structure

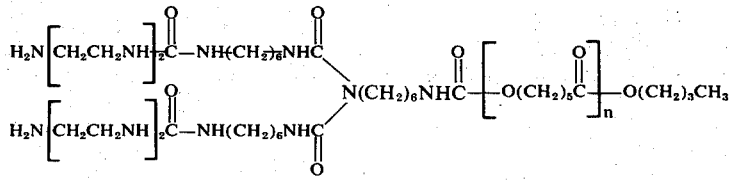

EXAMPLE 8

A mixture of

| | |
|---|---|
| Polyester prepolymer[1] and | 1315 parts |
| Methyl ethyl ketone | 1500 parts |

[1]Prepared by esterifying a terephthalic acid/isophthalic acid/azelaic acid 33/17/50 mixture with ethylene glycol. The product has an hydroxyl number of about 42–43.

was refluxed for one-half hour. One hundred eighty five parts of distillate were collected and discarded. To this mixture were then added, dropwise over a 15 minute period, 59.5 parts of phenyl isocyanate, followed by the addition of 5 drops of dibutylin dilaurate.

This reaction mass was refluxed for two hours and then added, dropwise over a ½ hour period, to 318.7 parts of Desmodur N. Five drops of dibutyltin dilaurate were added to the mixture, which was then refluxed for 2 hours and cooled to room temperature. To this were added 103 parts of diethylenetriamine, followed by 3 hours of refluxing.

The resulting product had the structure

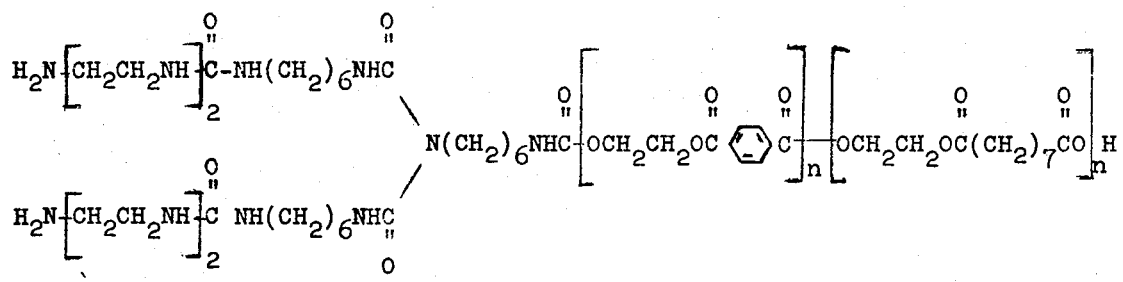

I claim:
1. A polymeric material of the formula

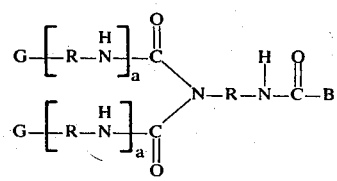

wherein
G is an amine, hydroxyamine, or mercapto-substituted amine;
R is an alkylene of 2–36 carbon atoms,

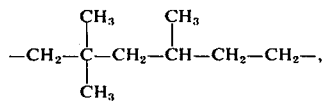

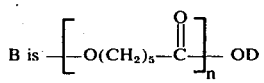

wherein $n=10$–200, and
D is an alkyl of 3–10 C;
and
$a$ is 1, 2, or 3.

2. The polymeric material of claim 1 wherein R is alkylene of 2 through 10 carbon atoms.

3. A polymeric material of the formula

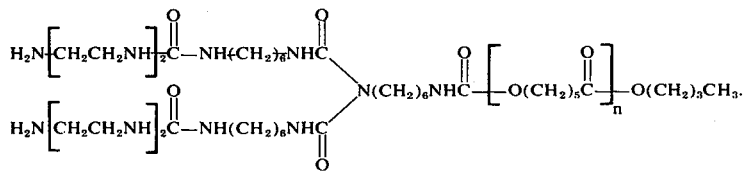

* * * * *